March 14, 1950 J. A. J. SUNSERI 2,500,648
CONVEYER MECHANISM FOR APRICOT CUTTERS
Filed Jan. 16, 1945 2 Sheets-Sheet 2

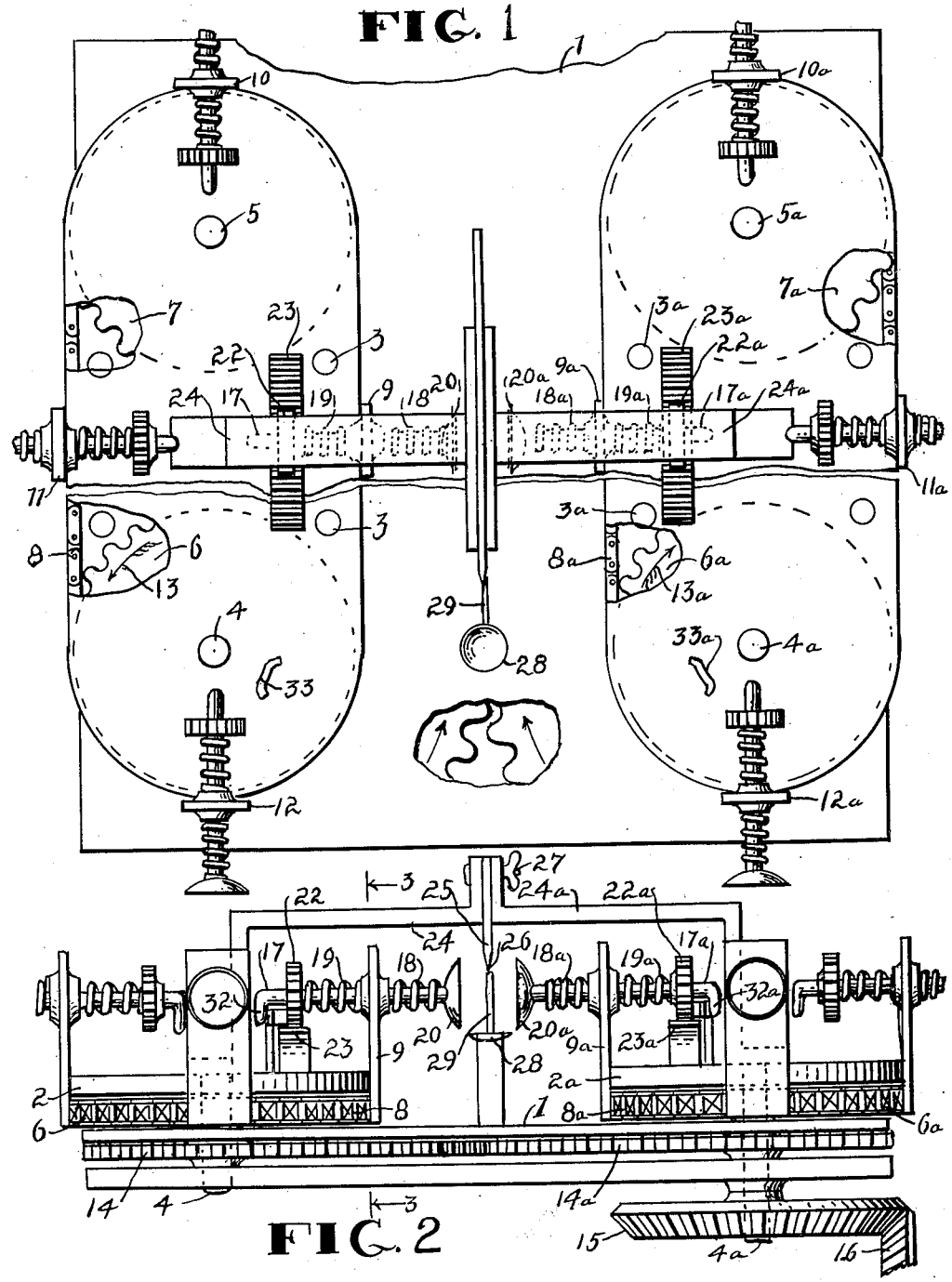

INVENTOR
Joseph A. J. Sunseri
BY John A. Ravensmith
ATTORNEY

Patented Mar. 14, 1950

2,500,648

UNITED STATES PATENT OFFICE 2,500,648

CONVEYER MECHANISM FOR APRICOT CUTTERS

Joseph A. J. Sunseri, San Jose, Calif.

Application January 16, 1945, Serial No. 573,032

3 Claims. (Cl. 198—179)

In the preparation of apricots for drying or canning, it has heretofore been customary for the cutter to take a single apricot in one hand, and a short straight-edged knife in the other hand, and then cut the flesh of the apricot along the dorsal-ventral plane of the pit by manipulating both the apricot and the knife. Similar results have also been accomplished by manually manipulating the apricot against a fixed knife, but the season during which the fruit is in condition for drying or canning is a short one, and immense quantities of fruit must be handled in a very short period of time. This presents a very serious condition at the present time because the shortage of cutters is very grave. Since a large cannery will handle many tons of the fruit in a single season, it is obvious that the speed with which the fruit may be cut is an exceedingly important problem. By greatly speeding up the cutting and pitting operation the period of time required to prepare a given quantity of fruit is materially reduced, or the number of operators may be materially reduced, in either case effecting an important saving to the cannery.

It is, therefore, one object of my invention to provide a machine that will automatically grasp a fruit, rotate it on a knife blade in such a manner as to cut the flesh into two halves, remove the pit and discharge the halves, thereby completely eliminating the manual manipulation of the fruit during the cutting operation.

It is another object of the invention to provide a machine of the character indicated that will accurately and positively cut the fruit as indicated; that will be small and compact; that will be simple in form and construction, economical in construction, strong, durable, and efficient in its practical application.

In the drawing:

Figure 1 is a top plan view of the machine with parts broken away.

Figure 2 is a front elevational view of the same with parts broken away.

Figure 3:
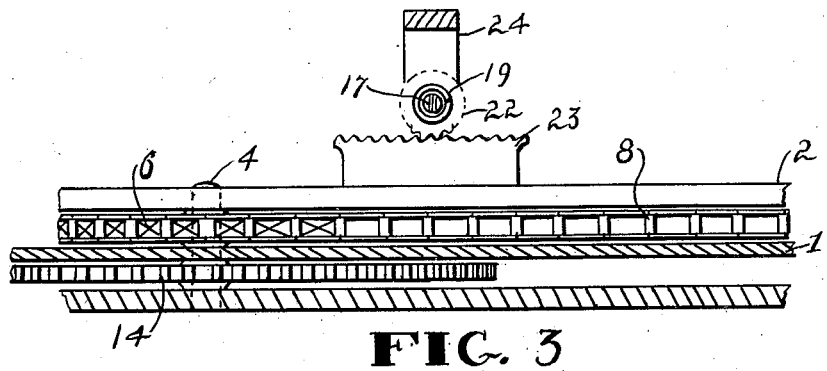
Figure 3 is a sectional view on line 3—3, Figure 2.
Figure 4:
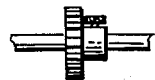
Figure 4 is a detail view of an alternative method of construction of the fruit-turning pinion.
Figure 5:
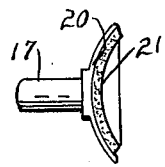
Figure 5 is an enlarged section through a fruit grasping cup.
Figure 6:
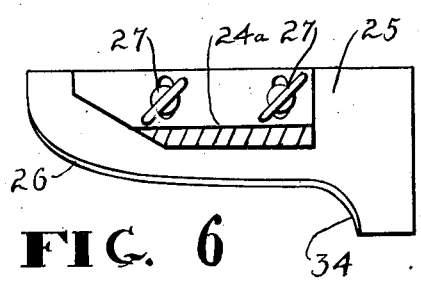
Figure 6 is a side elevational view of the fruit cutting knife.
Figure 7:
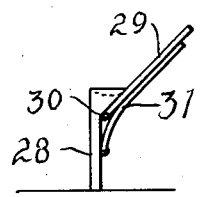
Figure 7 is a detail side elevational view of the fruit supporting means.

The machine comprises essentially a pair of identical fruit-cup grasping devices adapted to pick up a single fruit at a time from a positioning support and then rotate the same on a fixed knife placed between the two devices, and in the following description one device only will be described in detail and similar parts in the other device will be designated by similar reference characters followed by an appropriate letter.

Referring then more particularly to the drawing, I show at 1 a base plate having a top plate 2 supported in spaced relation thereto by pins 3, the two plates supporting spaced shafts 4 and 5 on which are mounted sprockets as 6 and 7. On sprockets 6 and 7 is mounted a chain 8 having a number of upstanding bars as 9, 10, 11 and 12 fixedly mounted in any suitable manner. The ends of plate 2 are semicircular in shape and are of substantially the same size as the sprockets 6 and 7 so that the bars 9, 10, 11 and 12 will slide against the outer edge of the plate and so be kept in an upright position.

The sprocket 6 is caused to rotate in the direction indicated by arrow 13 by means of gear 14 mounted on shaft 4, gear 14a meshing therewith, and mounted on shaft 4a and driven in any suitable manner as by bevel gears 15 and 16 from a source of power not shown.

On each of the upright bars as 9 is slidably mounted a stub shaft as 17, the same being directed radially with respect to the sprockets around which it moves and normally held in the position shown by springs as 18, 19. The outermost end of the stub shaft 17 is fitted with a cup shaped element 20 provided with a spongy lining 21 adapted to support an apricot from one side without injury. On the inner end of the shaft 17 is mounted a pinion 22.

Mounted on the top plate 2 in parallel relation with its side edge and spaced back from said edge a distance equal to the spacing of pinion 22 from the upright bar 9 and adapted to engage the pinion 22 at a certain point in its travel, is a rack 23. The rack 23 and pinion 22 are so proportioned and arranged that as the pinion passes the central part of the plate 2 the cup 20 will be quickly and positively rotated through a complete circle.

Mounted on plates 2 and 2a and extending up and over the two racks 23 and 23a are brackets 24 and 24a, and these brackets approach each other and support a cutting blade 25 in a vertical plane midway between the two plates 2 and 2a. The cutting edge of the blade is directed downwardly as at 26 and may be adjusted as desired by means of bolts and wing-nuts at 27.

A support for the apricot is shown at 28, said support having a rod 29 pivotally mounted thereon at 30 to extend upwardly back of the same, and normally held in an operative position by a spring 31.

In use, the operator picks up an apricot and places it in position on support 28 just prior to the arrival of the cups 20—20a at that point. In the present case the support 28 is disposed directly in front of the knife 25 and on a line connecting shafts 4—4a. To enable the cups 20—20a to properly grasp the apricot on the support they must be withdrawn a little just before they reach the fruit, and this is accomplished by forming a depending portion 32 on the inner end of shaft 17 in such a manner as to engage the baffle 33 mounted on plate 2 and pull the cups back a little and to release the shafts as the cups come to a point directly opposite to each other and permit the springs 18—18a to urge the cups toward each other, one engaging each side of the apricot and holding it firmly between them. The apricot is now carried off of the support, depressing the rod 29 which has supported it from the rear up to this time, and moving on to contact the cutting blade 25 which cuts its flesh to the pit. At this time the pinion 22 engages rack 23 and rapidly rotates the shaft 17—17a and cups 20—20a thereby cutting the pulp of the fruit into halves. As the fruit is carried on the depending portion of the knife at 34 engages the pit and pushes it out of the fruit while the two halves of the fruit are carried on and the cups 20—20a separate as they start to go in opposite directions in their appointed paths of travel.

It may now be readily understood that the speed of the machine in grasping and cutting the fruit is regulated to the speed at which the operator is able to place the apricots on the holder 28. And this, of course, depends upon the skill of the operator but she can do this very rapidly because she takes no part in the cutting operation and has only the placing of the fruit to think of.

The function of the upwardly extending member 29 on the fruit holder is to provide a back-stop for the fruit and hold it in position until it is removed, at which time it is shoved downwardly and out of the way while the fruit is moved to the cutting operation.

One of the chief values of the machine is that it will enable an operator to vastly increase her output over the old hand method of cutting, and at the same time it will completely eliminate all danger of injury to her hands since her hands never contact the knife at all. Under the old method cut fingers were common and the danger of infection was always present.

While I have shown only the preferred form of my invention, it should be understood that various changes and modifications may be made within the scope of the attached claims without departing from the spirit of the invention.

I claim:

1. A structure of the character described comprising, a base plate, a pair of laterally spaced and parallel top plates disposed thereover in spaced relation thereto and parallel therewith, a carrier chain disposed between the base plate and each top plate in parallel and in opposed relation to each other and means operative to drive the same at a uniform rate of speed in opposite directions with adjacent spaced runs moving in the same direction, upstanding and opposed elements disposed on the carrier chains to slidably engage the edges of the top plates, and opposed fruit engaging elements disposed on the upstanding elements.

2. The structure set forth in claim 1 wherein the last named fruit engaging elements include cup-shaped members provided with linings of material non-injurious to the fruit.

3. The structure set forth in claim 1 wherein the last named fruit engaging elements are provided with resilient linings.

JOSEPH A. J. SUNSERI.

REFERENCES CITED

The following references are of record in the file of this patent:

UNITED STATES PATENTS

| Number | Name | Date |
|---|---|---|
| 1,403,852 | Ensele | Jan. 17, 1922 |
| 1,407,524 | Fourely | Feb. 21, 1922 |
| 1,471,838 | Duncan | Oct. 23, 1923 |
| 1,785,014 | Norgaard | Dec. 6, 1930 |
| 1,888,528 | Faulds | Nov. 22, 1932 |
| 1,915,447 | Robbins | June 27, 1933 |
| 1,921,238 | Milam | Aug. 8, 1933 |
| 2,100,004 | Gibling | Nov. 23, 1937 |
| 2,185,090 | Mullen | Dec. 26, 1939 |
| 2,234,445 | Martinsen | Mar. 11, 1941 |
| 2,250,518 | Ashlock | July 29, 1941 |
| 2,254,595 | Carroll | Sept. 2, 1941 |
| 2,284,928 | Spohr | June 2, 1942 |
| 2,308,038 | Ashlock | Jan. 12, 1943 |